United States Patent [19]
Sutherland

[11] Patent Number: 5,567,110
[45] Date of Patent: Oct. 22, 1996

[54] ROBOT ARM STRUCTURE

[76] Inventor: Ivan E. Sutherland, 5139 Penton Rd., Pittsburgh, Pa. 15213

[21] Appl. No.: 446,009

[22] Filed: May 19, 1995

Related U.S. Application Data

[63] Continuation of Ser. No. 838,365, Feb. 19, 1992, abandoned, which is a continuation of Ser. No. 622,469, Dec. 5, 1990, abandoned, which is a continuation of Ser. No. 415,739, Oct. 2, 1989, abandoned, which is a division of Ser. No. 746,222, Jun. 18, 1985, Pat. No. 4,900,218, which is a continuation of Ser. No. 483,021, Apr. 7, 1983, abandoned.

[51] Int. Cl.⁶ .......................................................... B25J 9/00
[52] U.S. Cl. ........................ 414/735; 414/680; 74/490.04; 901/21; 901/22
[58] Field of Search .............................. 414/7, 735, 680; 901/14, 18, 21, 22, 80; 74/490.04

[56] References Cited

U.S. PATENT DOCUMENTS 3,284,964   11/1966   Saito ......................................... 414/7 X Primary Examiner—Donald W. Underwood
Attorney, Agent, or Firm—Darby & Darby

[57] ABSTRACT

Disclosed is a flexible robot arm structure utilizing an elongate skeletal frame member which can be controlled to assume any of a number of curved shapes as in the performance of automated operations. The arm functions somewhat like the body of a snake or an elephant's trunk. The skeletal frame defines a plurality of similar elemental segments disclosed in the form of disc-like structures as well as turns in a helical loading configuration. The helical form includes interleaved flexible helix members interconnected in a chain-link form. Displacement of sections in the arm is accomplished by the action of two separate mechanisms. A deflection mechanism provides power to flex or curve an arm section while a distribution mechanism distributes the curvature along the length of the arm to seek a smooth, circular curve. Illustrative embodiments use hydraulic actuators integral with the frame; however, equivalents are disclosed. The resulting arm is a highly repetitive, mechanical structure.

6 Claims, 4 Drawing Sheets

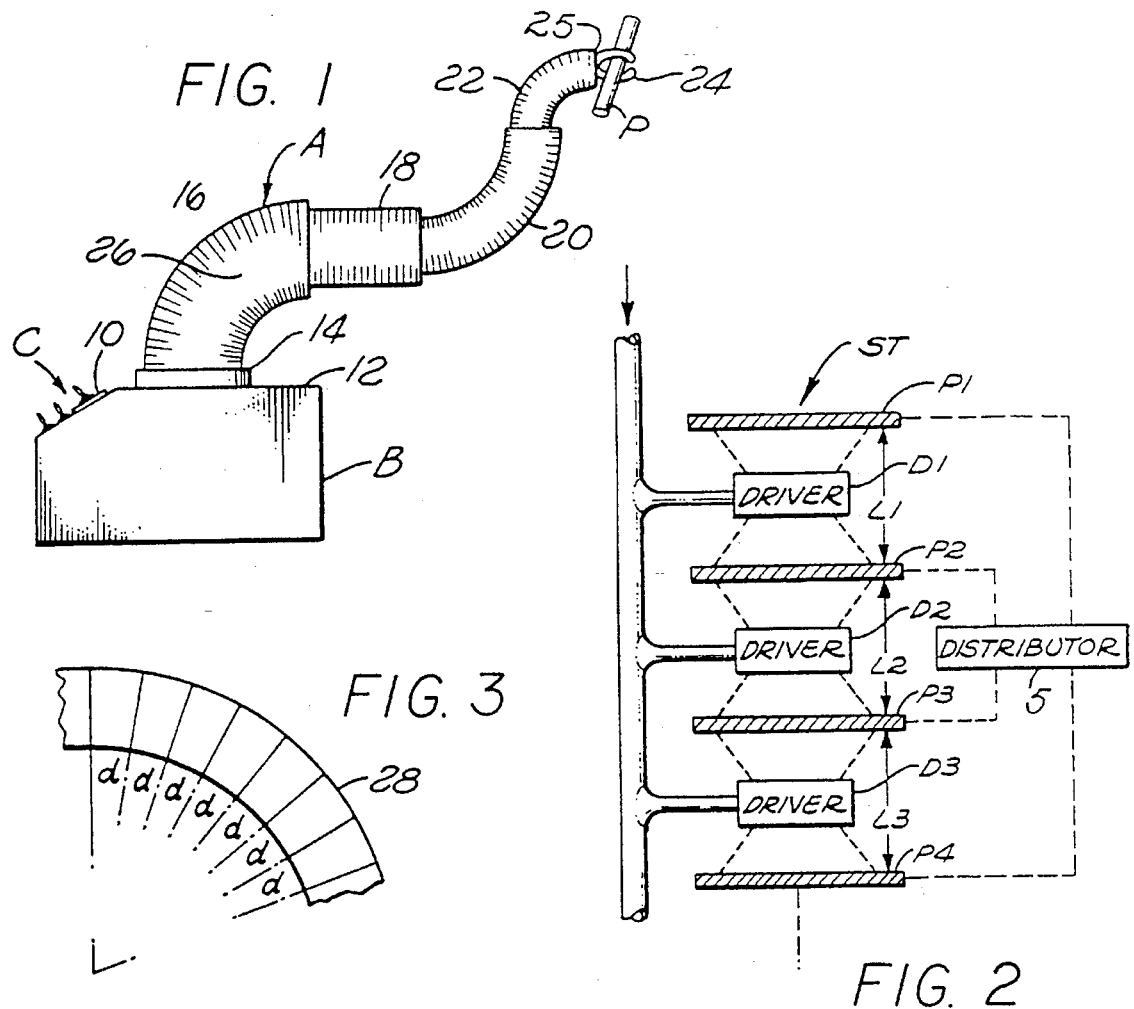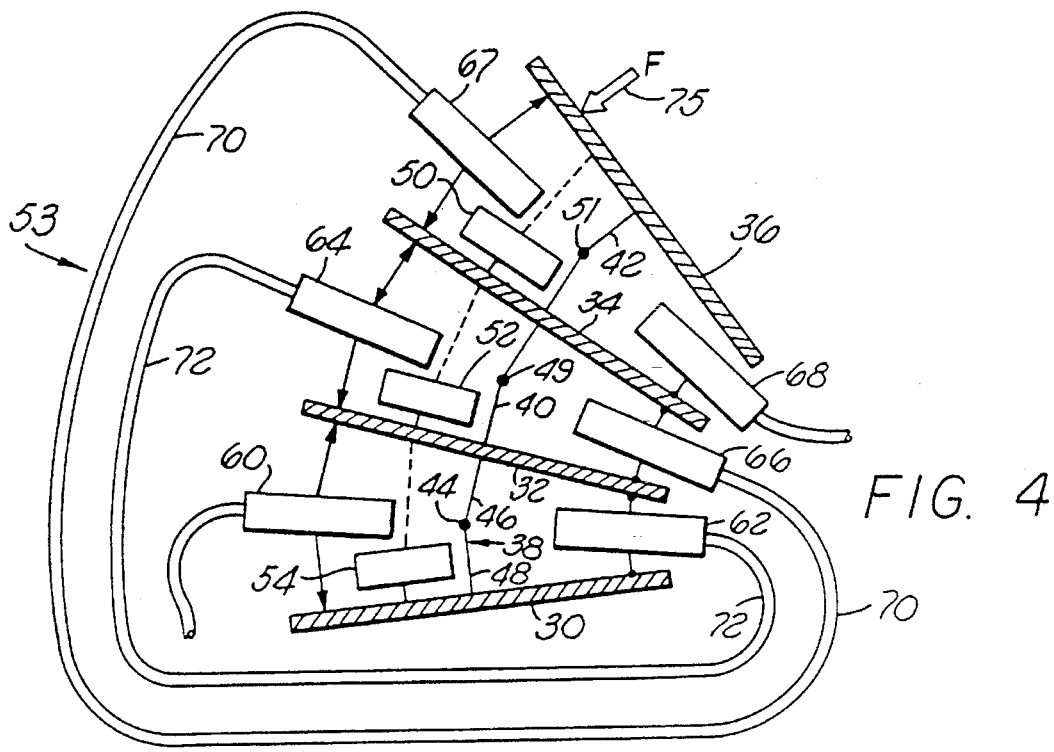

ROBOT ARM STRUCTURE

RELATED SUBJECT MATTER

This application is a continuation of application Ser. No. 07/838,365, filed Feb. 19, 1992, entitled "ROBOT ARM STRUCTURE," now abandoned, which is a continuation of application Ser. No. 07/622,469, filed Dec. 5, 1990, entitled "ROBOT ARM STRUCTURE," now abandoned, which is a continuation of application Ser. No. 07/414,739, filed Oct. 2, 1989, entitled "ROBOT ARM STRUCTURE," now abandoned, which is a divisional of Application Ser. No. 06/746,222, filed Jun. 18, 1985, entitled "ROBOT ARM STRUCTURE," now U.S. Pat. No. 4,900,218, which is a continuation of application Ser. No. 06/483,021, filed Apr. 7, 1983, entitled "ROTOT ARM STRUCTURE," now abandoned.

BACKGROUND AND SUMMARY OF THE INVENTION

Robot arms have been built in various configurations for many years and have recently come into widespread use in industry. Conventional forms of such arms now in common use have relatively few joints, for example, three to eight, which joints are separated by rigid members. Each of the joints in such conventional arms can either pivot or slide so that the arm can assume many different positions and thus perform useful functions. The joints in conventional arms are generally made from linear or circular bearings such as have been used in machinery for many years.

Conventional robot arms are moved by actuators associated individually with joints in the arm. Generally, the actuators are hydraulic, electric, or pneumatic, moving the joints either in a linear displacement or an angle at each joint. Traditionally, the control systems incorporate feedback loops to attain desired joint positions. That is, if the measured position and desired position do not coincide, control signals are developed to attain the desired position. Rate control is also sometimes used so that the various joints of an arm can be driven at preassigned rates as well as to preassigned positions.

Conventional robot arms are generally made as rigid as possible so that the actual position of the arm corresponds closely to the ideal position as it would be specified by measurements from all of the joints in the arm. Considerable design effort and cost are usually associated with removing unwanted flexibility from an arm. In that regard, some unwanted flexibility occurs in the rigid segments between the joints while other flexibility comes from inaccuracies in the fit of the joints themselves. Such undesired flexibility shows up as an inaccuracy in the actual position of the arm even when each of the joint sensors has attained a proper position or angle. Thus, conventional robot arms require accurate and close-fitting joint bearings along with construction to provide rigidity as well as accurate joint-position sensors.

Conventional jointed robot arms generally have several inherent disadvantages. First, as indicated above, such arms require the use of precision bearings and multiple sensors at considerable expense. Also, because the accuracy of conventional arms is related to the rigidity of the structure, reliable control is difficult when dealing with variable loads on the arm. Furthermore, conventional robot arms frequently incorporate joints which force sharp bends in cables, wires, hoses, and other communication or power-delivery circuits as may be positioned within the arms to service devices along the length of the arm. Such sharp bends are troublesome because the cables passing through them are subjected to repeated sharp flexing.

There have been previous proposals to construct a robot arm of flexible curvature with motion patterns resembling those of an elephant's trunk. A prior U.S. Pat. No. 3,712,481 (Harwood) discloses a mechanical arrangement incorporating rotating wedges proposed to force the arm into a particular curvature. The system requires a multiplicity of bearings with the resulting inherent problems and difficulty of construction and control.

U.S. Pat. No. 3,284,964 (Saito) discloses a system proposing to use a sequence of stacked bellows to accomplish arm curvature. The patent does not disclose any means for distributing the curvature uniformly along the length of a bent segment of the arm. Consequently, the system would be susceptible to control difficulties as explained in somewhat greater detail below.

The structure of U.S. Pat. No. 2,765,930 (Greer et al.) is subject to the same difficulty as that of the Saito patent in that it does not incorporate apparatus for distributing a curvature along a specific length.

U.S. Pat. No. 4,107,948 (Molaug) discloses a mechanical system of flexures that are driven by a single actuator at one end of the arm. The single actuator (rather than a distributed actuator system) fails to attain the desired control for an effective flexible arm.

In addition to the above considerations, each of the structures disclosed in the above patents tends to be mechanically complex and relatively expensive to produce. On the contrary, the system of the present invention provides a flexible robot arm which can be relatively inexpensive to produce and which also can be effectively controlled in a variety of applications.

The system of the present invention incorporates an elongate, skeletal frame member of elemental flexibility which is powered by collective deflection means to seek a particular configuration. The structure further incorporates distribution apparatus for elementally controlling the frame member to accomplish a substantially uniform curve along the length of each section. The sections may be constructed using a skeletal frame formed by a multiplicity of hinged elements or alternatively by a continuous structure as in a double helical form.

In manufacturing the system, a multiplicity of similar preforms produced as by molding or stamping techniques can be assembled to accomplish the flexible robot arm including the deflection and curve distribution means. Several individual sections of curvature may be integrated into a composite arm which is highly repetitive and relatively easy to build and assemble for any of a variety of purposes.

BRIEF DESCRIPTION OF THE DRAWINGS

In the drawings, which constitute a part of this specification, exemplary embodiments of the invention are set forth as follows:

FIG. 1 is a perspective view of a flexible robot arm apparatus with multiple sections embodying the structure of the present invention;

FIG. 2 is a diagrammatic illustration of the conceptual operation of the arm apparatus of FIG. 1;

FIG. 3 is a diagrammatic representation illustrative of the segmental operation of sections in the arm of FIG. 1;

FIG. 4 is a diagrammatic and structural representation of a fragment of one embodiment of the arm of FIG. 1;

DESCRIPTION OF THE ILLUSTRATIVE EMBODIMENTS

Figure 5:
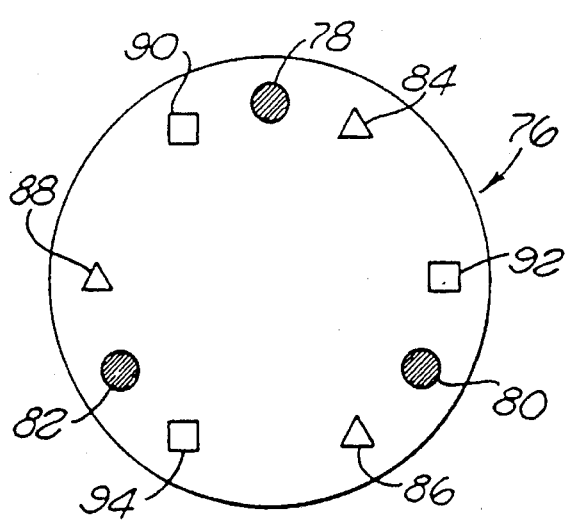
FIG. 5 is a diagrammatic cross-sectional representation to illustrate an applied force to move an arm in accordance herewith.
Figure 7:
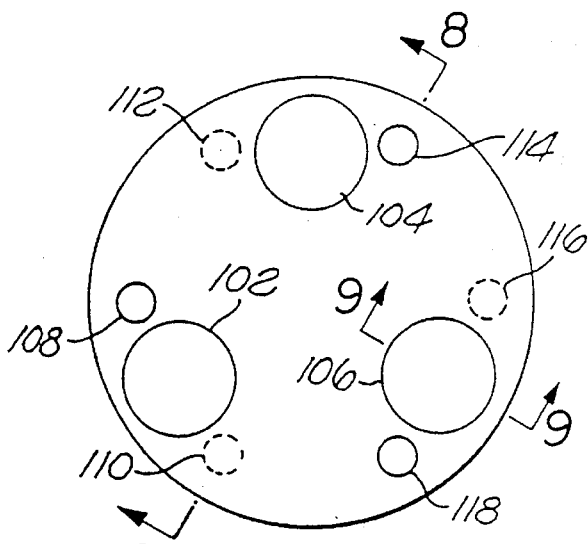
FIG. 7 is a plan view of a segmented element in the arm of FIG. 6.

As indicated above, detailed illustrative embodiments of the present invention are disclosed herein. However, detailed skeletal frame structures, powering elements, and control systems for arms operating in accordance with the present invention may vary considerably and assume a wide variety of forms, some of which may be quite different from those disclosed herein. Consequently, the specific structural and functional details disclosed herein are merely representative; yet in that regard, they are deemed to afford the best embodiment for purposes of disclosure and to provide a basis for the claims herein which define the scope of the present invention.

Referring initially to FIG. 1, a flexible robot arm A is mounted on a support base B. A control mechanism (not shown) activated by controls C and provided within the support base B actuates the arm A so as to accomplish any of a wide variety of work functions. For example, the arm might repeatedly transport workpieces, as the illustrated workpiece P, from one attainable location to another. The arm A may be programmed to repeatedly perform a specific operation as in a production facility. Alternatively, the arm A might be operated to accomplish specific individual motion patterns for any of a variety of purposes.

Considering the structure of FIG. 1 in somewhat greater detail, the support base B is a rigid structure housing electronic and hydraulic apparatus (in one embodiment) for actuating sections of the arm A to select positions in accordance with operating programs that are provided through the controls C on a panel 10.

The top 12 of the support base B carries a ring mount 14 as a base for an initial section 16 of the arm A. The section 16 is illustrated in the configuration of a ninety degree elbow turning from the vertical to the right. It is to be understood that the section 16 may assume a curvature of lesser angles and may curve in any direction.

The initial section 16 is connected to arm sections 18, 20, and 22 in sequence, each being progressively smaller in cross-sectional size. Arm sections 20 and 22 have a flexing capability similar to that of the section 16 while the section 18 moves to accomplish linear displacement somewhat analogous to a uniformly straight accordian motion. A clamp or effector 24 is provided at the end 25 of the section 22 terminating the arm A and functioning somewhat as a hand.

The individual sections of the arm A are covered with pleated sleeves, e.g. sleeve 26, which may comprise a durable fabric and serve to protect interior operating components of the arm, as from dirt and dust.

Within each of the arm sections, an elongate skeletal frame member is provided that can be powered into curved shapes according to signals in the control system that is housed in the support base B. One mechanism is provided in each of the arm sections to collectively deflect the segments while another mechanism forces the arm curvature to be uniform over the length of the section. Of course, different sections of the arm may bend in different ways independently of each other, however, in each section, the curvature is preserved substantially uniform and therefore substantially predictable.

FIG. 2 shows a stack ST of discs or plates P1, P2, P3, and P4 held spaced apart by drivers D1, D2, and D3. The plates represent a skeletal frame. The drivers D1, D2, and D3 may comprise hydraulic actuators to attain different angular spacing between the plates. For example, assume that by applied fluid from the passage 3, the drivers D1, D2, and D3 will lengthen the distances between the right edges of the plates P1, P2, P3, and P4 as represented by the lines L1, L2, and L3.

Ideally, lengthening the lines L1, L2, and L3 (while holding the opposed plate ends stationary) would put the stack ST of plates in a curved configuration. However, such variations as load distribution and response characteristics may cause other results. For example, all of the fluid supplied through the passage 3 might flow into the driver D1. Consequently, the change in position would occur solely between the plates P1 and P2. As another extreme possibility, all of the fluid might flow into the driver D3, only altering the positional relationship between the plates P3 and P4. Thus, control and response inconsistencies are apparent with unpredictable results.

In a system of the present invention as disclosed in detail below, a distribution apparatus 5 is coupled to the plates as indicated by dashed lines, to distribute the displacement and accordingly produce consistent substantially uniform curves in the stacked-plate configuration.

The elongate skeletal frames within the sections 16, 18, 20, and 22 may take various forms, however, as indicated above, each is constructed and controlled in such a manner that the curvature or bend in the section is maintained uniform over the length of that section. Reference to FIG. 3 illustrates the characteristic uniform curvature of the sections. Specifically, a fragment of an arm section is graphically represented in FIG. 3 illustrating a repetitive series of individual segments 28, e.g. interconnected discs to attain elemental flexibility. Each of the flexibly interconnected segments 28 is angularly offset from its adjacent segments to accomplish a curve as illustrated.

To consider the uniform curve of FIG. 3, the developed angles of offset for individual segments are maintained substantially equal. That is, the angles d are variable to accomplish different degrees of curvature within a section. However, as the section is controlled to assume different degrees of curvature, the angular offsets of the individual segments 28 (angles d) are maintained substantially equal to provide a uniform curve.

Considering a specific form of the structure as represented in FIG. 3, reference will now be made to FIG. 4. A plurality of discs are represented, specifically, discs 30, 32, 34, and 36 held in a concentric stack. The discs may be of various shapes, however, a specific form would be simply flat circular configurations constructed of a rigid relatively strong material, e.g. metal or plastic.

The discs of FIG. 4 are interconnected in an aligned elemental configuration by a series of separate hinge elements to accommodate variable planar relationships between the discs. Specifically, a hinge element 38 interconnects the discs 30 and 32, a hinge element 40 interconnects the discs 32 and 34, and a hinge element 42 interconnects the discs 34 and 36. The hinge elements each may comprise a pair of rod-like members interconnected by a univeral joint. Specifically, for example, the hinge element 38 includes a universal joint 44 interconnecting a pair of rods 46 and 48 which extend in opposite directions away from the joint 44 to connect co-axially with the facing discs 30 and 32. The hinge elements 40 and 42 respectively include universal joints 49 and 51.

The skeletal frame structure of FIG. 4 accommodates any of a variety of curved positions. For example, the structure may assume a sharper curve than that illustrated in FIG. 4 (in different directions) or alternatively the curve illustrated in FIG. 4 may be reduced so that the discs 30, 32, 34, and 36 lie substantially in axial alignment. Various configurations for the skeletal frame are attained by hydraulic operating components of the system.

In FIG. 4, components of two hydraulic systems are generally represented. To accomplish motion using pressure bellows for example, each hydraulic system could incorporate four pairs of quadrature-spaced bellows. One of the systems deflects the arm section, while the other distributes the deflection to a uniform curve. For purposes of explanation, the deflection system is represented by blocks "drivers" and the distribution system 53 is fragmentarily represented by a few of the diametrically opposed bellows to illustrate a two-dimensional explanation of the distribution operation. Note that while hydraulic systems are explained, it should be understood that suitable alternative deflection and distribution apparatus may be any of a variety of actuators. For example, the actuators could be implemented using electromagnetic coils, levers, cables, pneumatic drives, or other fluid-responsive apparatus, or other motivation structures as well known in the art. The curvature distribution system 53 for maintaining the curvature of the arm section substantially uniform might also take the form of a mechanical structure or a variety of other balancing or control apparatus as will be apparent to those skilled in the art.

Recapitulating, a system of the present invention, as an arm section of FIG. 4, includes a skeletal frame of elemental flexibility with one means for deflecting the frame to a curvature as by parallel hydraulics and another means for uniformly distributing that curvature along the arm section.

As illustrated in FIG. 4, deflection drivers are positioned between the discs. Specifically, as represented by a block 50, deflection drivers are fixed between the discs 34 and 36. Similarly, deflection drivers 52 are fixed between the discs 32 and 34, and deflection drivers 54 are fixed between the discs 30 and 32. The drivers 50, 52, and 54 deflect the arm section by adjusting the space relationship at aligned points between pairs of facing discs in the frame. Consequently, the disc structure defining the frame is contorted toward a particular curvature.

If the deflection drivers were the only positioning mechanism in the frame, the arm would not assume a predefined shape, but would be somewhat free to assume any of a variety of shapes because of non-uniform response of individual drives. For example, suppose a structure of many discs and further assume the inclusion of drivers that are fluid actuated and connected together in parallel so that the amounts of fluid in each are substantially equal so that the arm segment is in a straight line. From such a circumstance, if a curve were to be forcefully introduced into the arm section at one end, fluid necessarily would be displaced. That is, for the segments in the assumed curved portion to define a curve, fluid must be displaced from the drivers in that curved section.

The displaced fluid from the curved section would flow into other drivers of another portion of the arm section causing that portion to curve in an opposite direction. Consequently, with non-uniform loading, the initially straight section of the arm might assume any of a number of S-shaped configurations. Consequently, to achieve an effective and usable arm structure, it is necessary to provide an additional mechanism for distributing the curvature of a section uniformly along its length, i.e. a distribution system. For example, in FIG. 4, the hydraulic distribution system 53 includes sets of bellows along the arm section as illustrated for maintaining the desired uniform curvature. Specifically, a set of bellows is shown between each of the discs 30, 32, 34, and 36 along the frame, with interconnections provided to accomplish the distribution for preserving the desired uniform curvature.

To consider the structure of FIG. 4 in greater detail, between the discs 30 and 32, three pairs of distribution bellows might be mounted in 120° spaced relationship. Alternatively, four pairs of bellows could be in space-quadrature relationship. For the following two-dimensional explanation of operation, two of such bellows, bellows 60 and 62 are represented in the sectional view. However, as described below, bellows 60 and 62 are only part of the necessary bellows to control the three-dimensional planar relationship between opposing discs.

The bellows set including bellows 64 and 66 is mounted between discs 32 and 34 and a set including bellows 67 and 68 is mounted between discs 34 and 36. The represented bellows 64 and 66 in FIG. 4 are diametrically opposed across the pair of discs 32 and 34.

The bellows in the hydraulic distribution system 53 are interconnected. Specifically, for example, the bellows 67 (upper left) is hydraulically connected through a passage 70 to the bellows 66. Somewhat similarly, the bellows 64 is hydraulically connected through a passage 72 to the bellows 62. Thus, bellows in one space quadrature position are connected to bellows of an opposed space quadrature position in an adjacent frame segment.

In view of the above structural description of the fragmentary arm section as represented in FIG. 4, a fuller understanding thereof may now best be accomplished by assuming certain loading conditions along with certain responsive changes which will explain the operation of the arm. Accordingly, assume initially that the structure of FIG. 4 is deflected by the drivers 50, 52 and 54 to a curve as illustrated, defining a curvature from the horizontal disc 30 to the angularly offset disc 36 approaching the vertical. Also assume the application of a substantial external force F on the disc 36 as indicated by the arrow 75. Finally, assume that the applied force F is of sufficient magnitude to compress the bellows 67 sufficiently to change the angular relationship between the discs 34 and 36.

As the angular relationship between the discs 34 and 36 changes, the bellows 67 is compressed displacing fluid through the passage 70 into the bellows 66. Consequently, the displacement between the plates 34 and 36 is similarly reflected between the discs 32 and 34. The fluid received in the bellows 66 enlarges that bellows, compressing the bellows 64 and causing the displacement of another quantity of fluid which acts through the passage 72 to expand the bellows 62.

The consequence of the described flows between the interconnected bellows in the distribution system 53 is to distribute the displacement resulting from the assumed force F so that the angular relationship between the individual discs (segments) is uniform to provide a uniform curvature along the arm structure. Similar mechanisms distributed along the complete length of an arm section will cause each segment to assume the same angular displacement as its neighbors one either side and thus distribute the curvature uniformly along the arm section.

A non-linear curve in an arm section without a distribution system may result from factors other than loading forces. For example, the drive forces and displacements in a series of bellows are not likely to be uniformly similar.

The flexure distribution in an arm section, as explained above with reference to FIG. 4, will also occur with respect to the quadrature-related pairs of bellows of the system which are not represented in FIG. 4. That is, while the above description has been two dimensional in structure, three-dimensional operation is contemplated. Of course, as indicated above, persons skilled in the art also will recognize that the hydraulically activated bellows in the distribution system could be replaced by a number of alternative apparatus including mechanical, hydraulic, electrical, or other structures to accomplish a uniform curvature.

As generally explained above, in one embodiment of the arm section structure as represented in FIG. 4, there are four pairs of individual bellows in each set of distribution bellows between adjacent pairs of discs. That is, two oppositely acting bellows at each quadrature location. Referring to FIG. 4, bellows 60 and 62 (actually pairs) along with two other bellows pairs in space quadrature are fixed between the discs 30 and 32. Thus, the relative positions of discs are established. Note, however, that by reason of the fact that three points define a plane, an alternative arrangement may use only three pairs of bellows in each of the sets. Such an arrangement is graphically represented in FIG. 5 which will now be considered.

A disc configuration 76 is represented for multiple use in an arm section segment. FIG. 5 shows symbols on the disc 76 for three different forms of bellows at specific locations. That is, in 120° spaced relationship, double-acting hydraulic deflection bellows 78, 80, and 82 are represented by circles. Somewhat similarly, hydraulic pressure-acting distribution bellows 84, 86, and 88 are represented by triangles while hydraulic distribution bellows 90, 92, and 94 are represented by squares.

Under various operating circumstances, the deflection bellows 78, 80, and 82 of successive segments are connected in three parallel strings to receive or release quantities of drive fluid to produce predetermined planar relationships between pairs of adjacent discs as represented by the disc configuration 76. In that manner, offset deflection between discs is accomplished. The remaining distribution bellows function to maintain the curvature of the arm section uniform. The curve distribution operation is substantially as explained above. For example, if a load is applied to compress the distribution bellows 84 (located between one pair of discs) the displaced fluid resulting from such compression is applied to a bellows 94 which is located between an adjacent disc pair. Consequently, bellows represented by triangles in FIG. 5 are connected to bellows represented by squares in the next adjacent space between a pair of discs. Accordingly, the distribution bellows preserve a uniform curvature along the length of a specific arm section.

Figure 6:
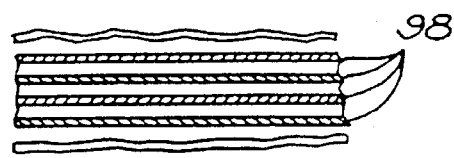
FIG. 6 is a fragmentary view of disc segments in one embodiment of an arm in accordance herewith.

A structure with the operating arrangement as represented in FIG. 5 may be embodied as illustrated in FIGS. 6, 7, 8, and 9. FIG. 6 shows a stack of discs or plates 98 which are formed to define integral bellows chambers that physically interconnect to accomplish the bellows actuator configurations as described with reference to FIG. 5. Specifically, between each of the discs 98 of coincident diameter, (FIG. 7) chambers are provided to form three deflection bellows 102, 104, and 106 along with six distribution bellows. On either side of the deflection bellows 102, smaller distribution bellows 108 and 110 are provided. Somewhat similarly, on each side of the deflection bellows 104 there are distribution bellows 112 and 114. Finally, distribution bellows 116 and 118 are on either side of the bellows 106.

To accomplish the physical structure, each of the several plates 98 defines cavities for the bellows. While the cavities for the deflection bellows 102, 104, and 106 all open to the same side of the plate 98, alternative of the distribution bellows are formed to open at opposite sides of the plate.

Figure 9:
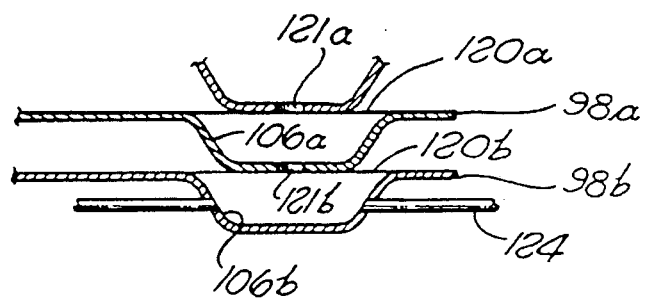
FIG. 9 is a fragmentary sectional view taken along line 9—9 of FIG. 7.

Considering the structure of the deformed plates to define bellows chambers, the sectional view of FIG. 9 illustrates bellows spaces 106a and 106b. Membranes 120a and 120b are secured to the plates 98a and 98b (as by adhesive) so as to close the defined spaces 106a and 106b in a bellows configuration except for ports 121a and 121b. Accordingly, a skeletal frame of elemental flexibility is provided. The membrane 120 closing one bellows space is also affixed to the next adjacent plate 98 so that the plates are bonded together in a unitary structure. Each of the bellows spaces 106 is interconnected through the ports 121 and a tube 124 pressurizes and relieves the bellows to orient the stacked configuration of the individual plates 98. Thus, by hydraulically driving or relieving the stacks of bellows, the stack of plates 98 can be responsively deflected toward various curvatures.

Figure 8:
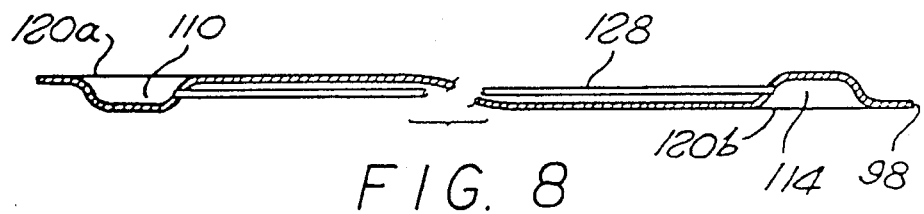
FIG. 8 is a fragmentary sectional view taken along line 8—8 of FIG. 7.

The distribution bellows of the structure of FIG. 6 are accomplished somewhat similarly by the oppositely facing bellows spaces and are interconnected in opposed relationship as explained above. Referring to FIG. 8, the plate 98 is sectioned to reveal that the space of bellows 110 opens in a direction opposed to that of the bellows 114. A tubular conduit 128 extends to interconnect the bellows 110 and 114. Just as explained above, membranes 120a and 120b then close the bellows 110 and 114, respectively. Consequently, the diametrically opposed action structure as explained above is provided.

A flexible arm section as illustrated in FIGS. 6, 7, 8, and 9 may be produced by stamping the discs or plates 98 of metal or forming the plates of plastic as by vacuum-forming techniques. Of course, a variety of other manufacturing methods also might be employed. The plates with the bellows spaces defined therein as explained above are then assembled by the placement of the interconnection tubes 124 and 128 and the membranes 120. The resulting structure may be operated in the manner of the system explained with reference to FIG. 4. However, it is noteworthy that the system of FIGS. 6, 7, 8, and 9 affords an economical structure for mass production of the skeletal frame with elemental flexibility and with integral bellows chambers.

To consider still another structural embodiment of She present invention, reference will now be made initially to FIG. 10. Again, the system is embodied in a hydraulic operating form using bellows to accomplish both the deflection and the elemental distribution along the length of the structure. Again, the system employs angularly offset bellows to accomplish both the deflection and the distribution to attain uniform curvature. As indicated above, other driver means can be utilized; however, for convenience and ease of explanation, hydraulic bellows are again incorporated.

Figure 10:
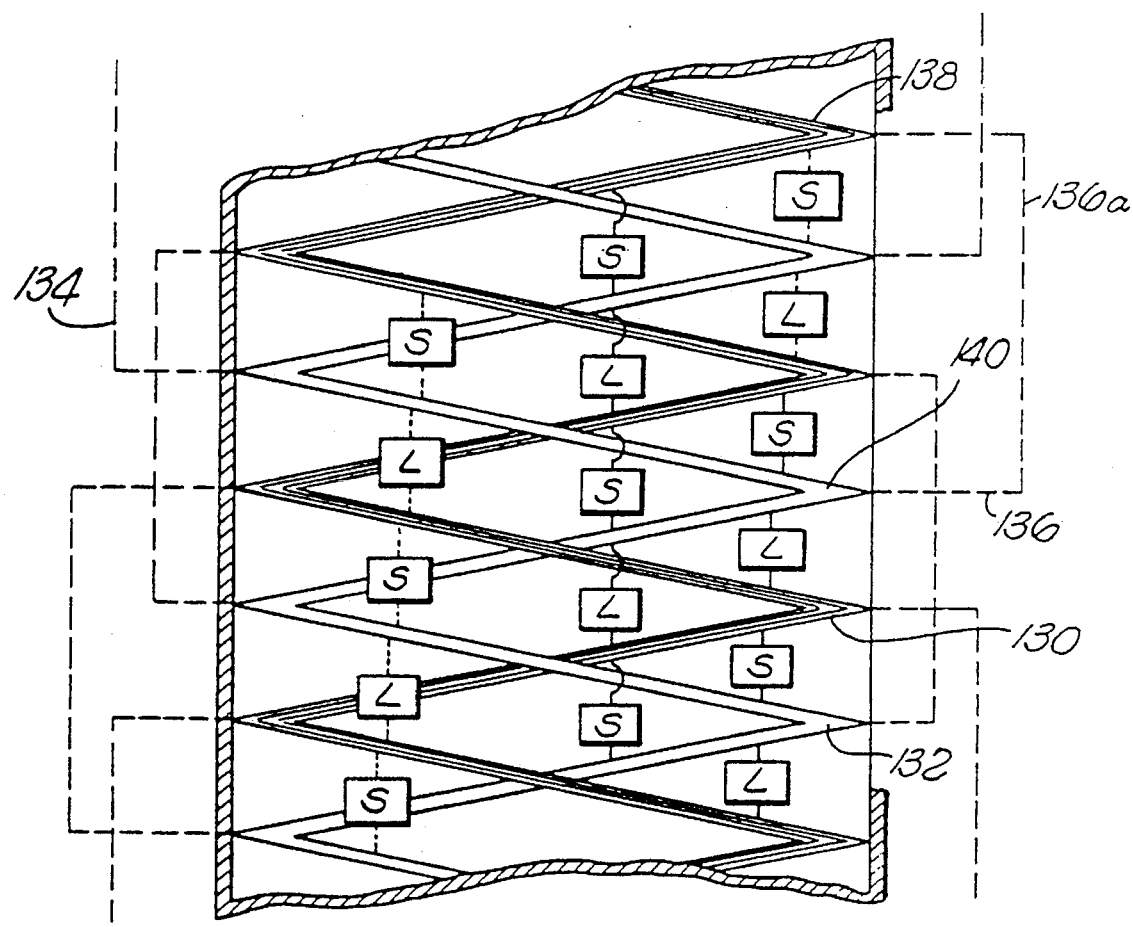
FIG. 10 is a cut-away and diagrammatic view of an alternative form of construction for sections of the arm of FIG. 1.

As represented in FIG. 10, a pair of interleaved or entwined helixes 130 and 132 of coincident diameter provide the skeletal frame of the arm section with elemental flexibility. In order to better distinguish between the helix 130 and the helix 132, turns of the helix 130 are lightly shaded. The intercoiled helixes 130 and 132 may be similar and formed of various materials. In the embodiment as disclosed, these structures comprise plastic material formed by joining a number of injection molded portions, e.g. turns. As described in detail below, such injection molded portions incorporate hydraulic passages and bulbous cavities to function as the bellows members. However, initially to accomplish an understanding of-the system as represented in FIG. 10, the bellows are illustrated by blocks labeled L and S.

Each of the blocks L and S represents three individual bellows and as illustrated, the sets-of-three are angularly offset on the circular configuration of the arm section, disposed in 120° spaced relationship. The bellows sets labeled S are mechanically attached (as represented) to lie with the helix 130 above and the helix 132 below. Conversely, the bellows sets L are attached to lie with the helix 132 above and the helix 130 below.

At their continuous peripheral edge, both of the helixes 130 and 132 include radially extending tabs which are interconnected to accomplish the chain-like couplings 133 (FIG. 12) represented by dashed lines 134 and 136. Specifically, for example, at the top right of the drawing a peripheral edge of a turn 138 (FIG. 10) in the helix 130 is connected, as represented by a dashed line 136a, to a helical turn 140 which is in the helix 132 and separated from the turn 138 by two intermediate turns. Thus, the peripheral edges of the helix turns are interconnected by tab couplings 133 (FIG. 12) which are molded as an integral part of the structure. The similarity of the structure (along one transverse section) to a chain is apparent in FIG. 12.

In the arm section structure as illustrated in FIG. 10, expansion of the bellows sets S and L have two different consequences. Expansion of the bellows sets L increase the length of the arm section. Conversely, expansion of the bellows sets S reduce the length of the arm section. Accordingly, if each of the bellows sets L is expanded to increase the space containing such bellows sets, the effect is to lengthen the arm section. Conversely, similar expansion by the bellows sets S contracts the arm section to a shorter length. This action may not be readily apparent from a study of FIG. 10; and as a result, a somewhat graphic representation is provided in FIG. 11 for representing the action involved.

Figure 11:
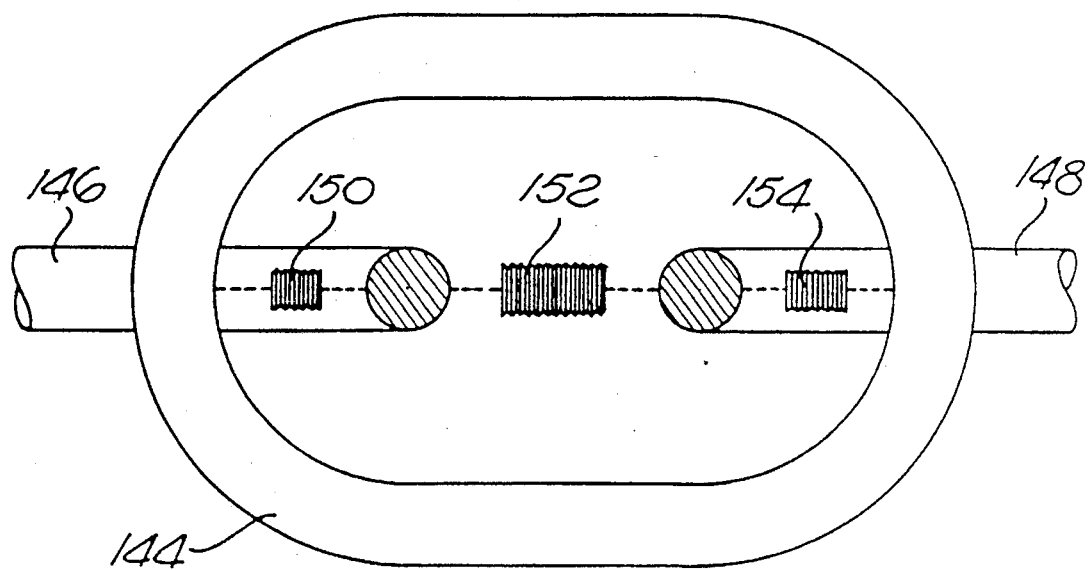
FIG. 11 is a diagrammatic view illustrative of the operation of a fragment of structure for use in an arm section of FIG. 10.

The interconnection of helix turns as interleaved resilient members and as represented by the lines 134 and 136 (FIG. 10) can be analogized to a simple link chain as fragmentarily represented in FIG. 11. The complete analogy might be best considered as several link chains, e.g. four, in space quadrature extending axially parallel to the interleaved helixes. Consider just one such chain. Essentially, a chain link 144 (FIG. 11) interconnects a pair of adjacent links 146 and 148. If a bellows is placed at each of the three interconnection spaces in the link 144, a structure is provided which is somewhat analogous to that of FIG. 10. Specifically, a bellows 150 is connected between the internal surfaces of the links 146 and 144, a bellows 152 is connected between the external surfaces of the links 146 and 148, and a bellows 154 is connected between the internal surfaces of the links 148 and 144.

Considering the arrangement of FIG. 11, if the bellows 152 is expanded (necessarily contracting the bellows 150 and 154), the length of the chain increases. Conversely, if the bellows 150 and 154 expand (necessarily contracting the bellows 152), then the length of the chain decreases. A similar action exists with respect to the interleaved or entwined helixes 130 and 132 of FIG. 10. Recapitulating, expansion of the bellows sets S (FIG. 10) shortens the configuration while expansion of the bellows sets L lengthens the configuration. Of course, in the operation of the structure, lengthening either of the bellows sets accomplishes contraction or shortening of the opposed bellows sets.

The action of the bellows sets S and L as explained above can be utilized to accomplish an arm section having the capability to assume varying lengths. Such an arm section is illustrated in FIG. 1 as the arm section 18. An arm section 18 utilizing the structure of FIG. 10 would simply incorporate controls to pressurize the bellows sets L and concurrently relieve the bellows sets S to lengthen the arm. Alternatively, to shorten the arm, the bellows sets S would be pressurized and the bellows sets L would be relieved.

The selective driving of the bellows sets S and L can also accomplish the curved motions of arm sections 16, 20, and 22 (FIG. 1) although control is somewhat more complex when the angularly offset bellows sets are selectively controlled to expand the helix frame on one side and contract it on another side. The interface between each pair of helix turns in the structure of FIG. 10 contains three bellows sets, therefore, the bellows sets of the arm section can be pressurized and relieved so that the three bellows sets define various planes between turns in the helixes to establish the desired curvature.

Figure 13:
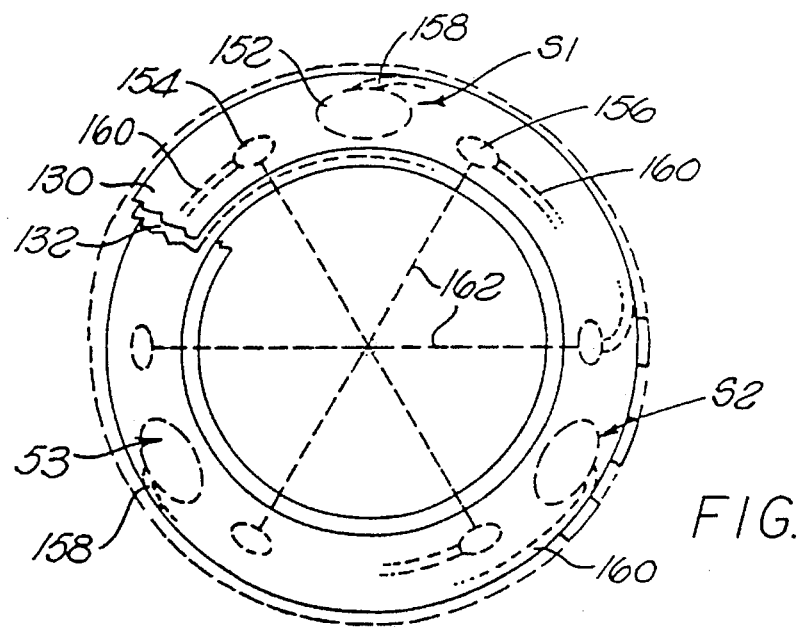
FIG. 13 is another fragmentary sectional view of the arm structure illustrated in FIG. 10.

In flexing the skeletal frame which is defined by the interleaved helixes 130 and 132, the bellows sets are driven to accomplish both deflection and distribution as explained above with respect to the earlier embodiments. In that regard, the bellows sets S and L each include three separate bellows somewhat as represented in FIG. 13. A deflection bellows in each set initiates the desired deflection. Two distribution bellows in each set accomplish a uniform curve in the arm section. The deflection bellows are driven by a control system to seek a desired deflection. In one form of control, the deflection bellows are simply connected for pressurization and relief. The distribution bellows are interconnected as described above so that the curvature of the arm section is distributed to accomplish a uniform curve.

Three of the bellows sets S or L as represented by blocks in FIG. 10 are shown in FIG. 13 between the turns of the interleaved helixes 130 and 132. The three bellows sets are designated sets S1, S2, and S3. As explained above, each of the bellows sets includes three distinct bellows. Specifically, for example, the bellows set S1 includes a deflection bellows 152 along with distribution bellows 154 and 156. The bellows sets S2 and S3 include three similar such bellows.

The deflection bellows, as the bellows 152, are coupled through molded passages 158 to receive levels of hydraulic pressure to accomplish deflection of the arm section. The distribution bellows 154 and 156 each are connected through molded passages 160 to a diametrically opposed similar bellows between an adjacent pair of helix turns. Such connections also are accomplished through molded passages 160, however, the couplings are also indicated by dashed lines 162 in FIG. 13.

A comprehensive understanding of the operation and function performed by the distribution bellows may be furthered by another reference to the chain-analogy graphic representation of FIG. 11. Assume, for example, that tension forces are applied to the links 146 and 148 in the form of a load and that such forces cause the bellows 150 and 154 to be compressed slightly while the bellows 152 is elongated. Analogizing to the system of the present invention, the objective is to avoid having such load adjustment occur in a single link of the chain. Consequently, distribution bellows analogous to the bellows 150 and 154 in one link of the chain are effectively connected to a distribution bellows similar to the bellows 152 in an adjacent link of the chain, or using the total analogy, at the opposite side of the structure. Therefore, as the assumed displacement occurs compressing the bellows 150 and 154, the fluid displaced from such bellows is applied to a bellows similar to the bellows 152 in the adjacent link to distribute the displacement so that it is sequenced down the chain. Similarly, in the flexible arm structure, forces are applied between segments of an arm section (at opposite sides) so as to distribute the angular offset defined within a segment (disc or the like) to maintain a uniform curvature throughout the arm section.

Figure 12:
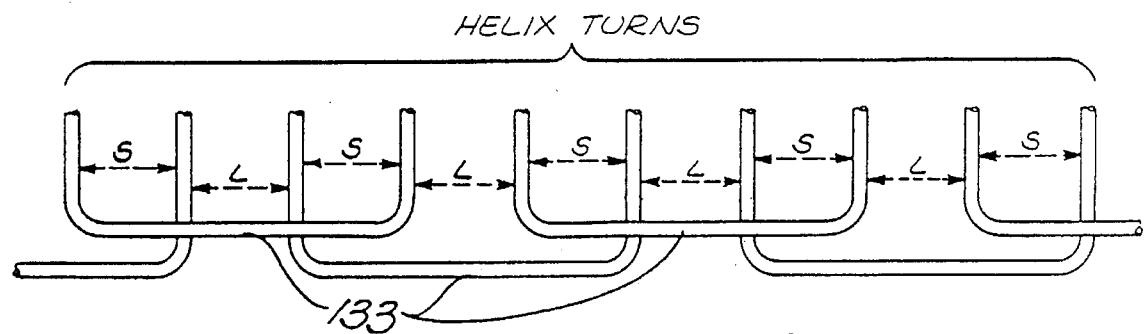
FIG. 12 is a fragmentary cross-sectional view of the arm construction of FIG. 10.

In the operation of an arm section as represented in FIGS. 10, 12, and 13, the deflection bellows are pressurized and relieved to seek a predetermined configuration for the arm section. Note that as the bellows are pressurized, the tabs 133 (FIG. 12) resist the lengthening tendency of the arm section to limit displacement in that regard. With such deflection accomplished, the distribution bellows maintain the uniform curvature which is important to the operation of a system in accordance with the present invention.

The robot arm structures as described are capable of moving into any of a large number of positions by the suitable introduction of fluid into the deflection chambers or bellows of the various segments, e.g. segments 16, 18, 20, and 22 (FIG. 1). Each section, accordingly, can be bent separately in either of two mutually perpendicular directions. Consequently, an arm with at least three sections will be able to move in six different ways and position its hand or effector, e.g. effector 24 (FIG. 1) in ways limited only by the maximum curvature that each section can reach.

Figure 14:
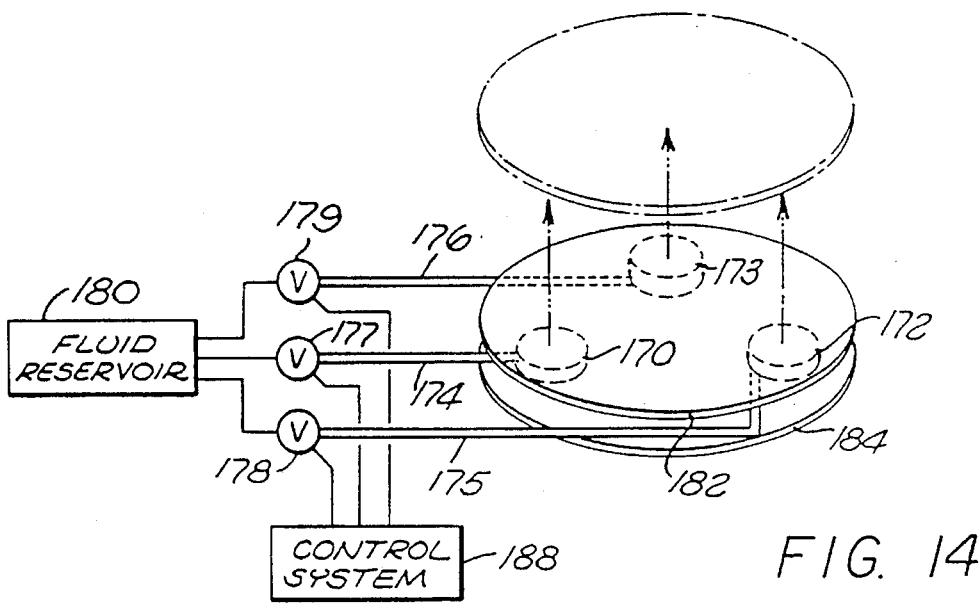
FIG. 14 is a fragmentary perspective and diagrammatic view of a deflection control apparatus for an arm in accordance herewith.

In various applications of an arm in accordance herewith, various control systems may be provided for hydraulically or otherwise driving the arm to attain desired positions. Essentially, the deflection bellows may be driven as gangs somewhat as represented singly in FIG. 14. Bellows gangs 170, 172, and 173 are connected through hydraulic lines 174, 175, and 176, respectively, and valves 177, 178, and 179, respectively, to a fluid reservoir system 180. Accordingly, the bellows can be individually pressurized or relieved to establish a multitude of angular offsets between segment discs 182 and 184 mounted at the ends of the bellows. In the same manner, collective control of stacks of bellows by a control system 188 would attain a curve in a stack of discs as the discs 182 and 184.

From the above descriptions and explanations of the embodiments herein, it will be apparent that the combined effects of collective deflection and elemental curve distribution of an elemental skeletal frame attains a reliable and repeatable robot arm with several advantages. Recognizing that such a system may be variously implemented, the invention is deemed to be as set forth in the claims.

What is claimed is:

1. A robot arm structure for transporting load pieces and accordingly being subjected to variable loads, comprising:

an elongate skeletal frame member having a plurality of elemental segments, said elemental segments aligned in sequence along said frame member to provide at least one segment, positioned between a preceding segment and a following segment within said frame member, said robot arm structure having elemental flexibility;

a plurality of deflection bellows for deflecting said frame member toward a substantially uniform curvature, said deflection bellows being arranged into groups wherein each of said groups resides within a distinct elemental segment of said frame member, said groups of said preceding, said one and said following segments jointly forming parallel strings of deflection bellows along said frame member, said deflection bellows containing deflection fluid; and at least one set of distribution bellows residing within said one segment, said set comprising a first and a second distribution bellows positioned oppositely of each other within said one segment;

a first mate and a second mate distribution bellows, said first mate distribution bellows positioned oppositely of said first distribution bellows but in said preceding segment and said second mate distribution bellows positioned oppositely of said second distribution bellows but in said following segment for elementally distributing the curvature of said frame member to attain and maintain said substantially uniform curve along the length thereof with the application of a load;

a first distribution fluid conduit interconnecting only said first distribution bellows and said first mate distribution bellows, and a second distribution fluid conduit interconnecting only said second distribution bellows and said second mate distribution bellows, wherein each interconnected distribution bellows and its respective mate distribution bellows contain a fixed quantity of distribution fluid that is separate and distinct from the fluid in any other distribution bellows and its respective mate distribution bellows and from said deflection fluid notwithstanding the application of load.

2. A robot arm structure in accordance with claim 1, wherein internal pressure in said distribution bellows and their respective mates remains substantially constant.

3. A robot arm structure in accordance with claim 1 wherein each elemental segment contains at least three deflection bellows.

4. A robot arm structure in accordance with claim 1 further comprising a controller to control movement of said deflection fluid in said deflection bellows.

5. A robot arm structure in accordance with claim 1, further comprising a hydraulic driver system for driving said deflection bellows.

6. A robot arm structure for transporting load pieces and accordingly being subjected to variable loads, said robot arm structure comprising:

at least one arm component comprising:
an elongate skeletal frame member including a plurality of elemental segment defined by a plurality of discs positioned in a concentric stack, said elemental segments aligned to provide at least a first segment, a second segment and a third segment;
a plurality of deflection bellows configured within said frame member for deflecting said frame member toward a curvature, said deflection bellows being arranged in groups, each of said groups being positioned within a distinct elemental segment, said deflection bellows containing deflection fluid;

a plurality of A distribution bellows positioned within said first segment;

a plurality of B distribution bellows and a plurality of A-mate distribution bellows all positioned within said second segment, said A-mate distribution bellows being equal in number to said A distribution bellows with one positioned oppositely from each said A distribution bellows in said first segment;

a plurality of B-mate distribution bellows positioned within said third segment and said B mate distribution bellows being equal in number to said B distribution bellows with one positioned oppositely of each said B distribution bellows in said second segment, a set a A fluid conduits each interconnecting a distinct one of said A distribution bellows with a distinct one of said A-mate distribution bellows and a set of B fluid conduits each interconnecting a distinct of said B distribution bellows with a distinct one of said B-mate distribution bellows, wherein each interconnected distribution bellows and its respective mate distribution bellows contain a fixed volume of distribution fluid that is separate and distinct from the fluid any other interconnected distribution bellows and its respective mate distribution bellows and from said deflection fluid notwithstanding the application of load; and an effector affixed at one end of said arm component for grasping said load.

* * * * *